(12) United States Patent
Callaghan et al.

(10) Patent No.: US 7,512,974 B2
(45) Date of Patent: Mar. 31, 2009

(54) COMPUTER SYSTEM AND PROGRAM TO UPDATE SSL CERTIFICATES

(75) Inventors: Patrick Joseph Callaghan, Vestal, NY (US); James Patrick Hennessy, Vestal, NY (US); Stephen Richard Nichols, Endicott, NY (US); Kurt Norman Schroeder, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/954,558

(22) Filed: Sep. 30, 2004

(65) Prior Publication Data

US 2006/0075219 A1    Apr. 6, 2006

(51) Int. Cl.
*H04L 29/00* (2006.01)
(52) U.S. Cl. .............................. 726/14; 726/21; 726/27; 713/157; 713/158; 713/169; 713/173; 713/175; 713/176
(58) Field of Classification Search .................. 713/157, 713/158, 169, 173, 175, 176; 726/14, 21, 726/27
See application file for complete search history.

(56) References Cited

U.S. PATENT DOCUMENTS 5,220,604 A * 6/1993 Gasser et al. .................. 707/9

(Continued)

FOREIGN PATENT DOCUMENTS

GB        236697 AA        3/2002

OTHER PUBLICATIONS

B. Kaliski; "Privacy Enhancement for Internet Electronic Mail: Part IV: Key Certification and Related Services"; "http://www.faqs.org/rfcs/rfc1424.html"; Feb. 1993; pp. 1-8.*

(Continued)

*Primary Examiner*—Carl Colin
(74) *Attorney, Agent, or Firm*—Silvy A. Murphy (57) ABSTRACT

System and computer program product for updating an SSL certificate for a server. First program instructions detect when a change has been made to a name, domain or IP address of the server and detect that the server is using an SSL certificate based on a name, domain or IP address applicable before the change. In response, the first program instructions notify an administrator that a change is required to the SSL certificate to reflect the change to the name, domain or IP address. Second program instructions respond to a request by the administrator, to automatically create a new SSL certificate signing request. The new SSL certificate signing request is a form which can be sent to an SSL certificate authority. Third program instructions respond to another request by the administrator, to send the new SSL certificate signing request to the SSL certificate authority. Fourth program instructions respond to receipt of a new SSL certificate from the SSL certificate authority and another request by the administrator, to substitute the new SSL certificate for the existing SSL certificate. Fourth program instructions query the administrator if the administrator wants to use a new self-signed SSL certificate reflecting the change to the name, domain or IP address of the server, until the new SSL certificate signed by the SSL certificate authority is received from the SSL certificate authority, and if so, generate the new SSL self-signed certificate. Other program instructions respond to a request by the administrator, to create a self-signed SSL certificate and substitute the self-signed SSL certificate for the existing SSL certificate.

5 Claims, 5 Drawing Sheets

U.S. PATENT DOCUMENTS

| | | | | |
|---|---|---|---|---|
| 5,903,882 | A * | 5/1999 | Asay et al. | 705/44 |
| 6,044,462 | A * | 3/2000 | Zubeldia et al. | 713/158 |
| 6,421,781 | B1 | 7/2002 | Fox et al. | 713/201 |
| 6,446,206 | B1 * | 9/2002 | Feldbaum | 713/175 |
| 6,922,776 | B2 * | 7/2005 | Cook et al. | 713/156 |
| 6,975,727 | B1 * | 12/2005 | Vandergeest | 380/277 |
| 6,981,139 | B2 * | 12/2005 | Enokida | 713/156 |
| 6,981,148 | B1 * | 12/2005 | Jim et al. | 713/175 |
| 7,131,003 | B2 * | 10/2006 | Lord et al. | 713/168 |
| 7,143,144 | B2 * | 11/2006 | Kanai et al. | 709/217 |
| 2001/0044894 | A1 * | 11/2001 | Saito et al. | 713/156 |
| 2003/0065827 | A1 | 4/2003 | Skufca et al. | 709/315 |
| 2003/0105957 | A1 | 6/2003 | Brabson et al. | 713/164 |
| 2003/0126131 | A1 | 7/2003 | Cihula et al. | 707/9 |
| 2003/0191936 | A1 * | 10/2003 | Kawatsura et al. | 713/156 |
| 2004/0193872 | A1 * | 9/2004 | Saarepera et al. | 713/156 |
| 2004/0210597 | A1 * | 10/2004 | Wanish | 707/102 |
| 2005/0114653 | A1 * | 5/2005 | Sudia | 713/158 |

OTHER PUBLICATIONS

INSPEC—B2002-09-6120D-066 "Cross-Domain Access Control Via PKI", G. Denker, J. Millen & Y. Miyake.

"Efficeint, Dos-Resistant, Secure Key Exchange for Internet Protocols" By: W. Aiello pp. 48-58 AT&T Labs Research AIELLO@RESEARCH.ATT.COM.

"On the Performance, Feasibility, and Use of Forward-Secure Signatures" Eric Cronin, Sugih Jamin EEC Dep. University of Michigan Ann Arbor, MI 48109-2122 pp. 131-144.

IBM Technical Disclosure Bulletin RD n448 Aug. 2001 Article 125 p. 1400 GB820000345.

Inspec—B2002-09-6120D-066 "Cross-Domain Access Control Via PKI", G. Denker, J. Millen & Y. Miyake, 2002.

"Efficeint, Dos-Resistant, Secure Key Exchange for Internet Protocols" By: W. Aiello pp. 48-58 AT&T Labs Research AIELLO@RESEARCH.ATT.COM, Nov. 18-22, 2002.

"On the Performance, Feasibility, and Use of Forward-Secure Signatures" Eric Cronin, Sugih Jamin EEC Dep, University of Michigan Ann Arbor, MI 48109-2122 pp. 131-144, Oct. 27-31, 2003.

IBM Technical Disclosure Bulletin RD n448 Aug. 2001 Article 125 p. 1400 GB820000345.

* cited by examiner

COMPUTER SYSTEM AND PROGRAM TO UPDATE SSL CERTIFICATES

BACKGROUND OF THE INVENTION

The invention relates generally to computer systems, and deals more particularly with a technique to update an SSL certificate used to establish a secure, remote connection.

SSL certificates are known today to provide secure connections between two computers such as between a client and a server. An SSL certificate is an electronic certificate/document which attests to the binding of a public encryption key to an individual or computer. The SSL certificate allows verification of a claim by the individual or computer that a specific public key is associated with the individual or computer. This allows another party to be assured that the individual or computer is the entity to which this other party intends to communicate.

The SSL certificate can be "self-signed" or "certificate-authority signed". A "self-signed" certificate is a certificate issued by the individual or computer where the individual or computer itself vouches that the individual or computer identified in the certificate is associated with the public key contained in the certificate. A "certificate-authority signed" certificate is a certificate issued by a trusted, third party (i.e. a "certificate authority") which vouches that the individual or computer identified in the certificate is associated with the public key contained in the certificate.

The following is an example of a known use of an SSL certificate. A client requests from a server an SSL certificate (as a prelude to establishing a connection with the server). The client request for the SSL certificate specifies the host name, domain name, if any, and IP address of the server. The server responds with the SSL certificate, using a known X.509v3 format. The server either "self-signed" the certificate or obtained certificate-authority signing of the SSL certificate. The server has stored the SSL certificate in a server database. The SSL certificate includes either a fully-qualified "distinguished" name of the host or a short name of the host. The fully-qualified distinguished name includes the host name and host domain name. The short name includes the host name but not the host domain name; in some environments there is no domain name for the host. In both cases, the SSL certificate may optionally include a list of IP addresses of the host, as an extension of the SSL certificate. Also, in both cases, the SSL certificate specifies a public key used to encrypt some subsequent messages between the client and server. When the client receives the SSL certificate from the server, the client compares the host name and host domain name, host name or IP address in the original request made by the client to the distinguished name, short name certificate extension, if any, or IP address certificate extensions, if any, in the SSL certificate. If the host name and domain name, host name, or IP address match, then the client is confident that the server is the intended communication partner and proceeds to establish an (encrypted) SSL connection with the server. The client uses the public key to create another, session encryption key to encrypt the subsequent messages in the session. The server likewise uses this same session encryption key.

Occasionally, the host name, domain name, if any, or server IP address changes. For example, the host name and domain name may change when the server is moved from one owner to another owner. This is because the host name may specify the owner, and the domain name may specify an organizational layer within the owner. The server IP address may change when the server is moved to a different network. When the host name, domain name or server IP address changes, the definition of the SSL certificate stored by the server must be changed as well. Otherwise, when the server supplies the SSL certificate to the client, the host name, domain name, if any, and/or IP address will not match what is expected by the client. Consequently, the client may conclude that the server which supplied the certificate is not the intended communication partner and may not establish the connection with the server. Currently, the person who changes the host name, domain name or server IP address must remember to change the definition of the SSL certificate and then make the change manually.

An object of the present invention is to improve the process of updating the definition of an SSL certificate when the host name, domain name or server IP address changes.

SUMMARY OF THE INVENTION

The invention resides in a system and computer program product for updating an SSL certificate for a server. First program instructions detect when a change has been made to a name, domain or IP address of the server and detect that the server is using an SSL certificate based on a name, domain or IP address applicable before the change. In response, the first program instructions notify an administrator that a change is required to the SSL certificate to reflect the change to the name, domain or IP address.

In accordance with features of the present invention, second program instructions respond to a request by the administrator, to automatically create a new SSL certificate signing request. The new SSL certificate signing request is a form which can be sent to an SSL certificate authority. Third program instructions respond to another request by the administrator, to send the new SSL certificate signing request to the SSL certificate authority. Fourth program instructions respond to receipt of a new SSL certificate from the SSL certificate authority and another request by the administrator, to substitute the new SSL certificate for the existing SSL certificate. Fourth program instructions query the administrator if the administrator wants to use a new self-signed SSL certificate reflecting the change to the name, domain or IP address of the server, until the new SSL certificate signed by the SSL certificate authority is received from the SSL certificate authority, and if so, generate the new SSL self-signed certificate.

In accordance with other features of the present invention, other program instructions respond to a request by the administrator, to create a self-signed SSL certificate. Still other program instructions respond to creation of the self-signed SSL certificate and a request by an administrator, to substitute the self-signed SSL certificate for the existing SSL certificate.

DETAILED DESCRIPTION OF THE PREFERRED EMBODIMENTS

Figure 1:
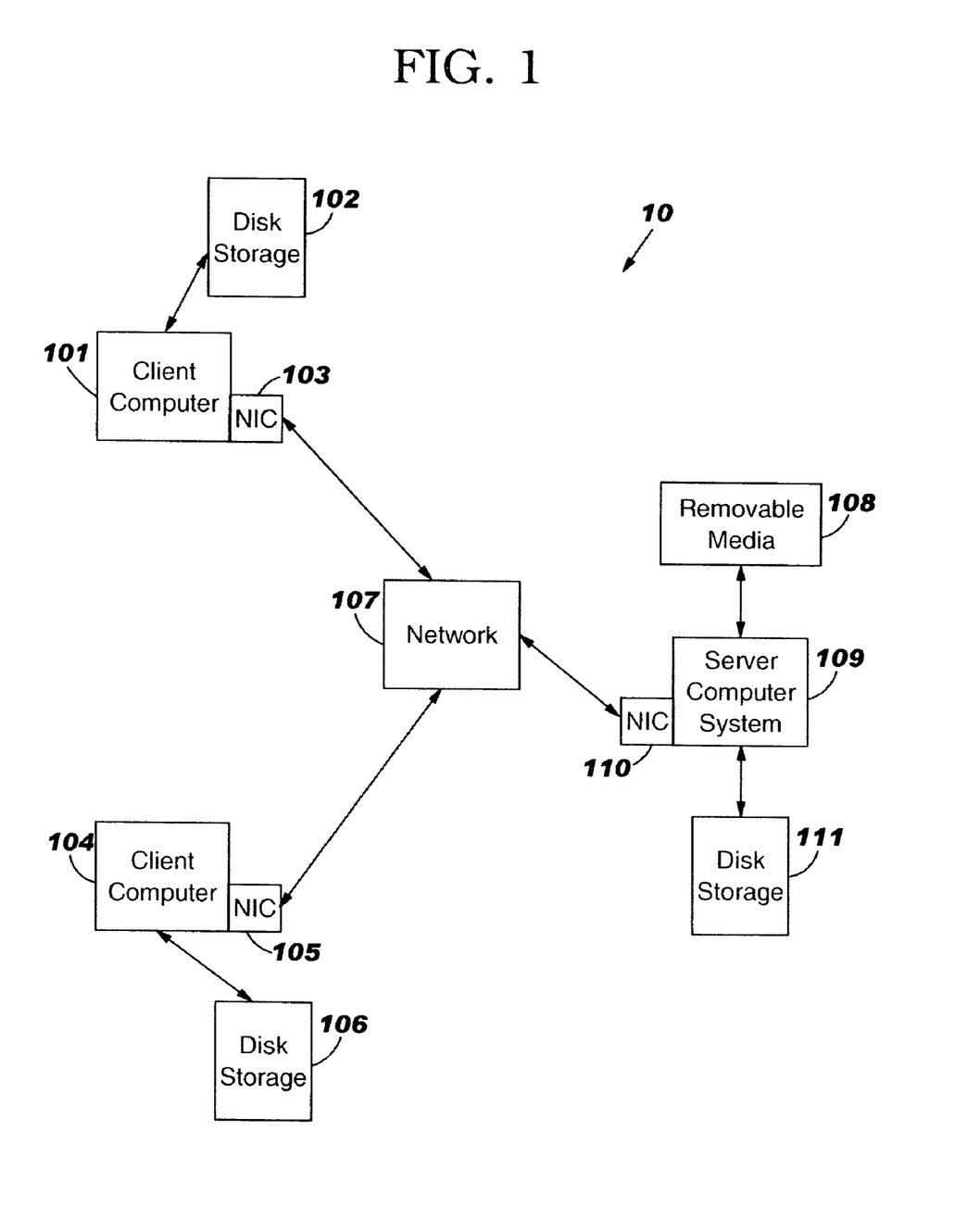
FIG. 1 is a block diagram of a network complex which incorporates the present invention.

The present invention will now be described in detail with reference to the figures. FIG. I illustrates a network complex generally designated 10 in which the present invention is incorporated and used. Network complex 10 comprises a multiplicity of client computers ("clients" for short) 101, 104, etc., a server computer system ("server system" for short) 109 and a network 107 interconnecting the client computers to the server computer system. By way of example, the network 107 can be an intranet, the Internet (including World Wide Web) or some other network. To permit such interconnection, each of the clients 101 and 104 includes a respective network interface card 103 and 105, and the server system 109 likewise includes a network interface card 110. Each of the network interface cards 103, 105 and 110 can be an Ethernet or Token Ring card or other hardware device to interconnect a computer to the network. Also, there is known communication hardware, such as cables and routers, within the network 107 and between the network cards 103 and 105 and the network card 110. An operator uses client 101 to remotely access and operate server system 109 using an SSL certificate to secure the connection. Clients 101 and 104 use respective disk storage devices 102 and 106 to store and read data bases described below. Server system 109 uses another disk storage device 111 to store data bases described below. Server system 109 uses a removable media device 108 such as writeable CD, floppy disk or DVD, to store and read other data bases described below.

Figure 2:
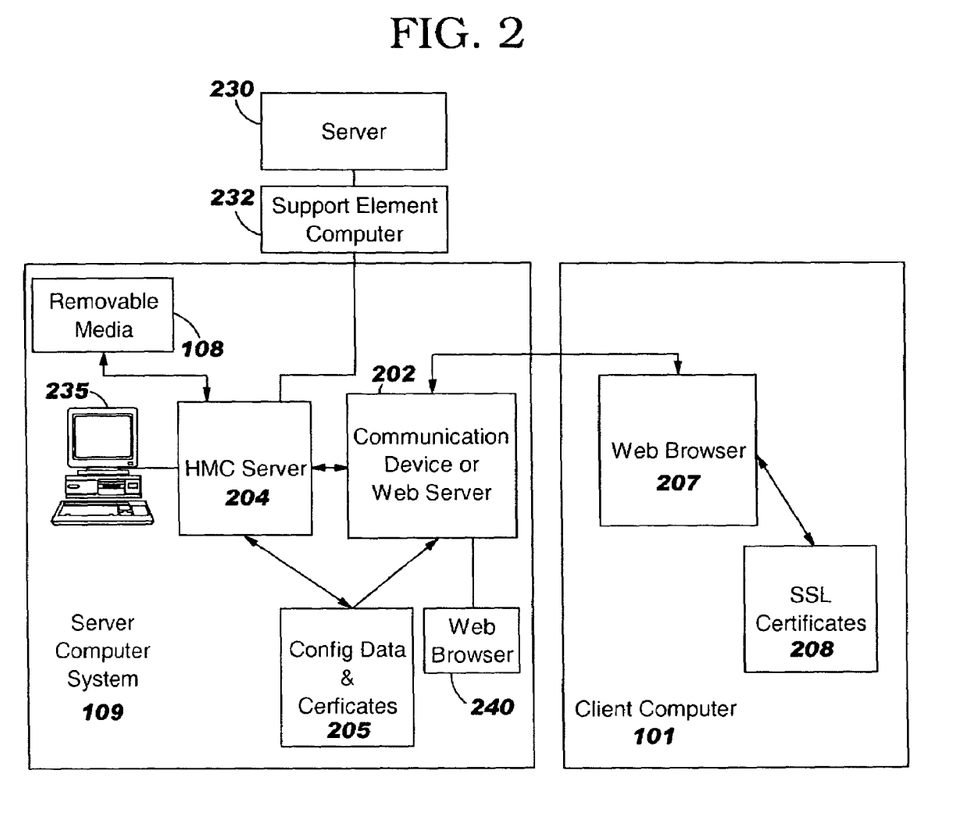
FIG. 2 is a more detailed block diagram of a client computer and a server computer system within the network complex of FIG. 1.

FIG. 2 illustrates client 101 and server system 109 in more detail. Client 101 includes a known web browser 207 and a data base 208 in disk storage 102. Server system 109 includes a known communication device 202 or web server to enable communication with the network 107 via the network interface card 110. (In the following description, communication device 202 is a web server, although that is not required.) Server system 109 also includes a management server 204 which controls a known production server 230 via a known support element computer 232, and provides a user interface for such management. The management functions of management server include the following: partitioning of resources (i.e. processors, memory, storage, I/O adapters, etc.) of the production server 230, turning on the production server 230, IMLing and IPLing the production server 230, diagnosing problems in the production server and notifying people responsible to fix the problems, turning off the production server, etc. By way of example, management server 204 is an IBM Hardware Management Console server.

Production server 230 executes applications and performs production tasks such as handling transactions, for client 101. Support element computer 232 implements the management functions requested through the management server 204. By way of example, support element computer 232 is an IBM Support Element which works in conjunction with the IBM Hardware Management Console server. Server system 109 also includes a configuration data and certificates data base 205 stored in disk storage 111 which servers 202 and 204 access.

Web browser 207 can communicate with web server 202 in a secured manner using an SSL certificate or in an unsecured manner without an SSL certificate. For some types of communications, web browser 207 will require a secured connection, and therefore, a valid SSL certificate from server system 109. To establish each SSL connection, web server 202 uses SSL certificates and configuration data stored in server data base 205. Web browser 207 in client computer 101 also uses SSL certificates stored in client data base 208. The client's SSL certificates may have been provided with the web browser product. The SSL certificates stored in client data base 208 are used to certify the authenticity of the SSL certificates provided by the server 109 when the SSL certificates provided by server 109 are "certifying-authority signed certificates". These certificate-authority signed certificates contain information about the certificate authority that vouches that the individual or computer, contained in the certificate, is associated with the public key contained in the certificate. The SSL certificates stored in client data base 208 contain the public key of the most popular certifying authorities, and are used to authenticate that the information about the CA in the certificate provided by the server is authentic. Management server 204 creates and modifies the SSL certificates stored in server data base 205, and web server 202 reads the certificates, as described in more detail below. In addition, management server 204 writes to removable media 108 certificate signing requests as described in more detail below.

Figure 3:
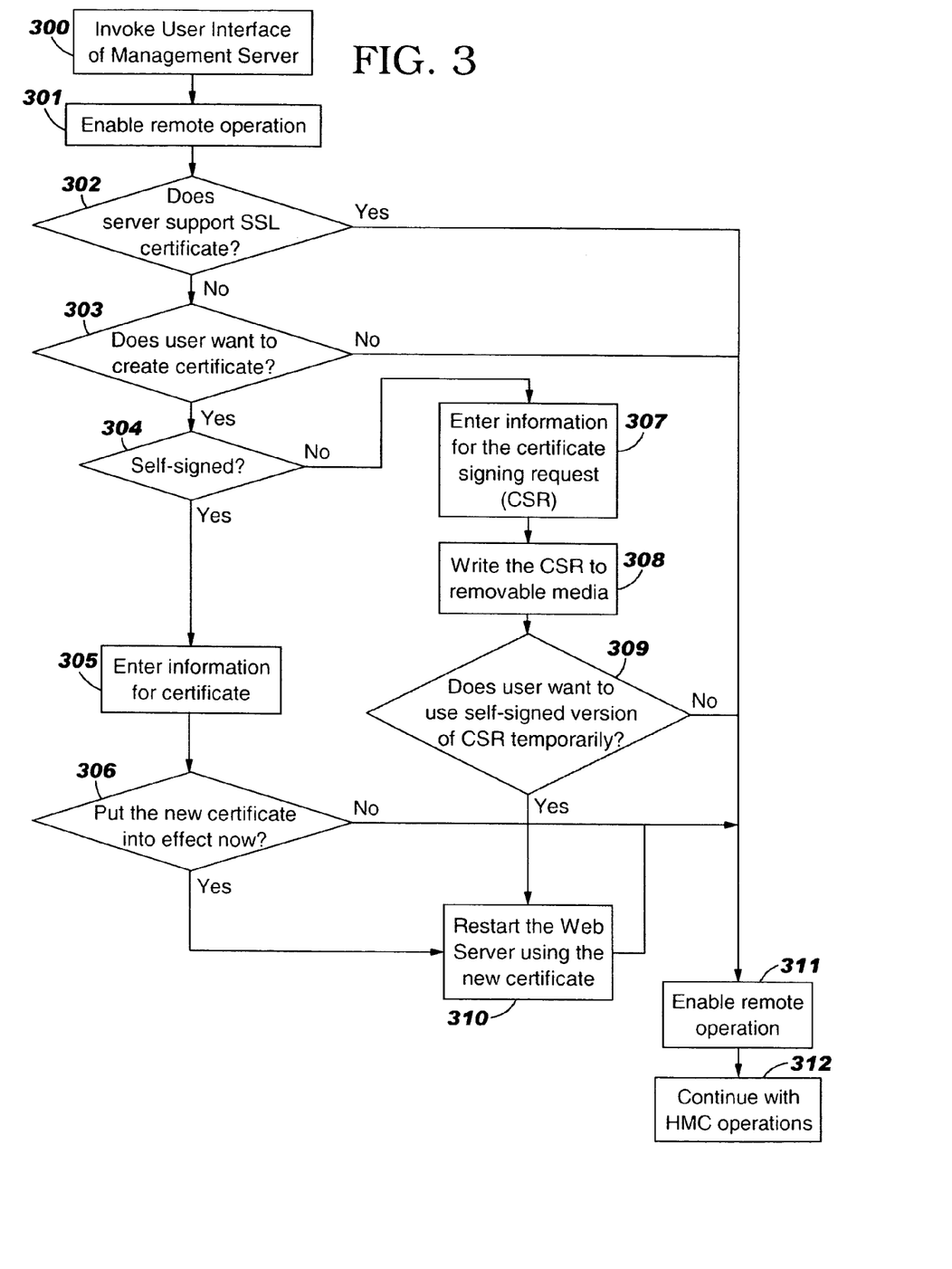
FIG. 3 is a flow chart illustrating operation of and processing by a management server within the server computer system of FIG. 2 to enable remote operation of the management server using an SSL certificate.

FIG. 3 is a flow chart illustrating the setup of remote operation of management server 204 by client 101 through web server 202 using an SSL certificate to establish a secure connection with web server 202. In step 300, an operator invokes web browser 240 on server 109 to access a user interface of management server 204 via web server 202. This will enable remote operation of management server 204, and indirect operation of production server 230 via management server 204 and support element computer 232. With the user interface, the operator requests remote access of management server 204 (step 301). In response, management server 204 determines if server system 109 is configured to support SSL certificates (step 302). This determination is made by checking a configuration table for server system 109. If so (which is the illustrated case) management server 204 complies with the request for remote access by allowing the operator of the web browser 240 to make control selections from the management server interface (step 311). However, if server system 109 is not already configured to support SSL certificates, then management server 204 queries the user if he or she would like server system 109 to furnish an SSL certificate for server system 109 at this time (step 303). If the user responds that he or she does not want an SSL certificate at this time, management server 204 complies with the request for remote access as described above in step 311 (without creating an SSL certificate). Refer again to step 303, yes branch where the operator responds that he or she wants server system 109 to furnish an SSL certificate for server system 109. In such a case, management server 204 queries the operator if he or she wants server system 109 to create a self-signed certificate or obtain a certificate signed by a certificate authority (step 304). If the operator responds that he or she wants a certificate signed by a certificate authority (step 304, no branch), management server 204 queries the operator to supply some of the information contained in the certificate such as the host name of server system 109 (step 307). After the operator supplies the requisite information, management server 204 creates a certificate signing request ("CSR") and writes it to removable media 203 (step 308). The operator of web browser 240 then emails or otherwise sends this CSR to a certificate authority such as VeriSign or Entrust. Typically, a well known certificate authority is used because the popular web browsers, such as Microsoft Internet Explorer and Netscape browsers, are packaged containing certificates for the well known certificate authorities. However, an administrator can choose another certificate authority if desired. Because it may take a significant amount of time for the certificate authority to receive and process the CSR and return a signed certificate, management server 204 queries the operator of web browser 240 if he or she wants to use a self-signed certificate (i.e. a certificate signed by server system 109), with the new host information entered in step 307, until management server 204 receives the certificate signed by the certificate authority (step 309). If the user chooses to use a self-signed certificate, management server 204 creates it (step 310), writes the certificate to a directory on database 205 where web server 202 expects SSL certificates to be, and restarts web server 202 so that it will start using the new self-signed certificate.

Refer again to step 304, yes branch where the operator of web browser 240 responds that he or she wants a self-signed certificate from the beginning. In such a case, management server 204 queries the operator to supply some of the information contained in the certificate such as the host name of server system 109 (step 305). After supplying the information, management server 204 creates the self-signed certificate and queries the operator if he or she would like to start using the new certificate immediately (step 306). If so, management server 204 restarts web server 202 so that the new self-signed certificate becomes operative (step 310). Then, management server 204 proceeds to step 311 to grant remote access to future remote clients of web server 202, for example, client 101. After step 311 (regardless of the path leading to step 311), the operator interfaces with management server 204 and thereby controls production server 230 via management server 204 and support element computer 232 (step 312).

Figure 4:
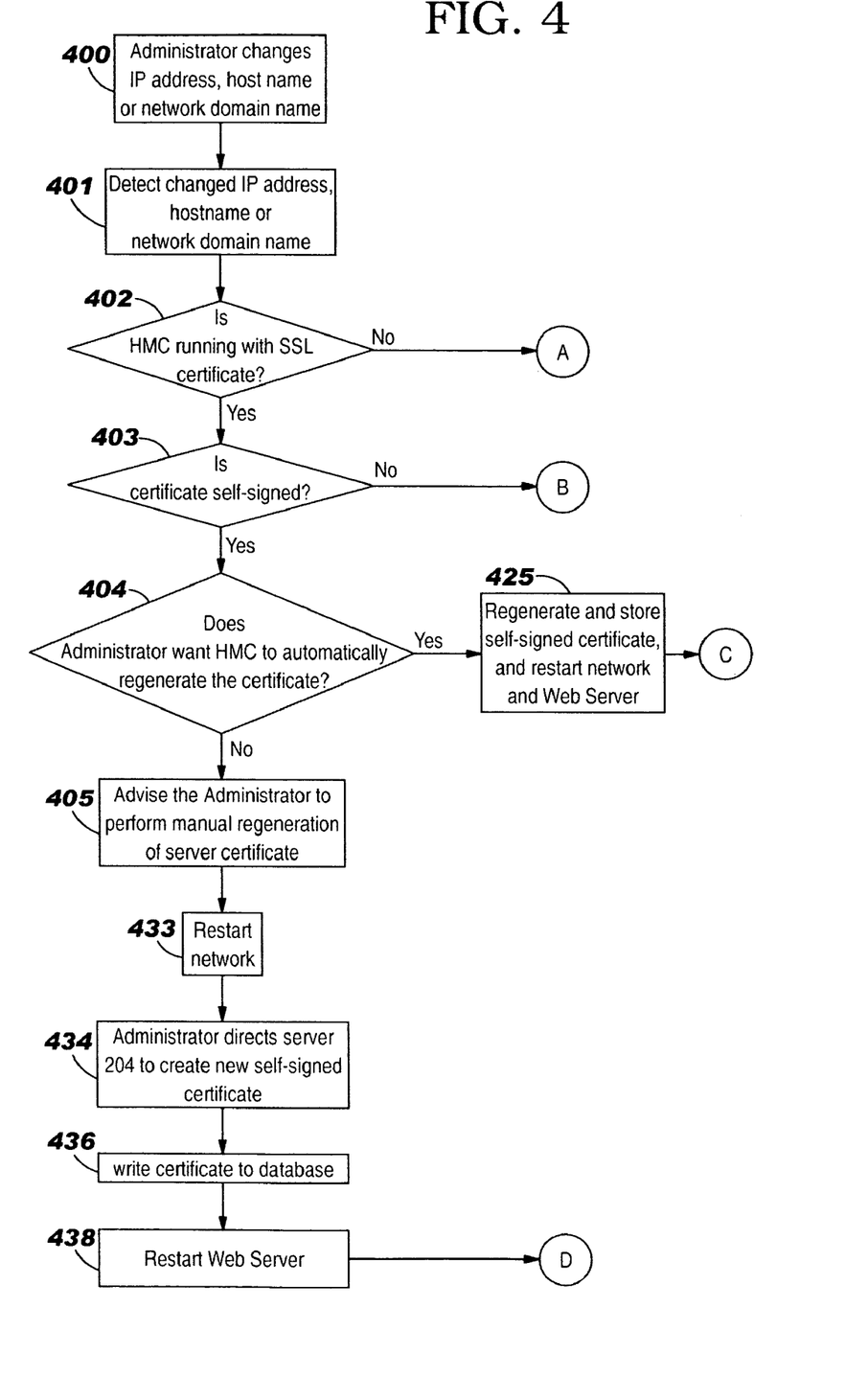
FIG. 4 is a flow chart illustrating operation of and processing by the management server according to the present invention when an operator changes an IP address, host name or network domain name of the management server.

FIG. 4 is a flow chart illustrating operation of and processing by web server 202 and management server 204 when an administrator of management server 204 changes an IP address, host name or network domain name of server system 109. In step 400, an administrator selects an option or application to change a network configuration setting for management server 204. If the management server 204 is an IBM Hardware Management Console server, this option or application is called "Configure Network Settings". The settings include the host name (e.g. "hmcserver"), network domain name (e.g. "ibm.com") and IP address of server system 109. The administrator can be located (locally) using web browser 240 and enter his or her selection through a console 235. Alternately, the administrator can be located (remotely) at client 101 and use a session setup as in FIG. 3 to access the user interface for management server 204. In the latter case, the SSL certificate will become inaccurate and ineffective after the administrator changes the network configuration setting, but will be effective as long as the current session is uninterrupted. (As described in more detail below, after the network configuration setting is changed during this session, the administrator will log off and restart web server 202 and the TCP/IP stack on server computer 109, to apply the new SSL certificate and network configuring setting changes to server system 109.)

In accordance with the present invention, when the local administrator at console 235 or remote administrator at a client makes the change to one or more network configuration settings for server system 109, management server 204 detects the change (step 401). (This detection of the change and the subsequent steps described below to update the SSL certificate accordingly, ensure that the SSL certificate is updated to reflect the change. This avoids the problem with the prior art where the network configuration setting was changed, but the SSL certificate was not changed.) After management server 204 detected the change, management server 204 determines if web server 202 is configured to support SSL certificates for any connection with any other computer (step 402). If not, the administrator restarts the TCP/IP stack on server system 109 to apply the change to the network configuration (step 411). Referring again to step 402, yes branch where management server 204 determines that web server 202 is configured to use SSL certificates. In such a case, management server 204 determines if the current SSL certificate for server system 109 is self-signed or signed by a certifying authority (decision 403). If the SSL certificate was signed by a certificate authority (decision 403, no branch), management server 204 automatically queries the administrator if he or she would like to have management server 204 automatically generate a new certificate signing request (CSR) using the new host information (i.e. the information that was changed in step 401) to obtain from the certificate authority an updated, signed SSL certificate with the new host information (step 406). It is necessary to obtain an updated SSL certificate because the information about server system 109 has been changed (although the change will not be applied until step 411). Thus, the information in the current SSL certificate regarding server system 109 will not match the information expected by the client 101 for server system 109 if web server 202 subsequently furnishes the current certificate to client 101. Consequently, the client 101 would not make a subsequent (intended to be secure) connection with web server 202, without the updated signed SSL certificate.

Referring again to decision 406, yes branch where the administrator responds that he or she wants management server 204 to generate a new, CSR with the updated server system 109 information, and thereby receive an updated, signed SSL certificate for server system 109. In such a case, management server 204 generates the new CSR containing the updated server system 109 information and writes it to removable media 203 (step 407). Because it may take a significant amount of time for the certificate authority to receive and process the CSR, and return an updated, signed SSL certificate, management server 204 queries the administrator if he or she wants to use a self-signed certificate (signed by server system 109), with the new information entered in step 401, until the signed certificate is received from the certificate authority (step 409). If the operator responds that he or she is willing to use a self-signed SSL certificate until the signed SSL certificate is received, management server 204 creates it and updates its certificate database 205 with the new signed certificate (step 410). Then, the management server 204 restarts the TCP/IP stack on server system 109 and restarts web server 202 to apply the changes made in step 401 (step 410). After subsequently receiving the updated SSL certificate from the certificate authority pursuant to the new CSR, the administrator directs management server 204 to write the new certificate to certificate database 205 and restart web server 202 to apply the changes made in step 401 (step 415). If in step 408, the administrator decides not to request or use a temporary, self-signed certificate, then management server 204 restarts the TCP/IP stack on server system 109 (step 430) to apply the changes made in step 401 and waits until the certificate-authority signed certificate is received to continue processing in step 415.

Refer again to step 406, no branch where the SSL certificate (before update) was signed by a certificate authority, and the administrator at client 101 does not want management server 204 to automatically generate a new CSR with the updated information about server system 109. Instead, the administrator himself or herself wants to generate a new CSR. In such a case, management server 204 notifies the administrator to manually initiate generation of a new CSR (step 422) and restarts the TCP/IP stack to apply the changes made in step 401 (step 432). In response, the administrator directs management server 204 to create a new CSR (step 424) and send the CSR to a certificate authority specified by the administrator (step 426). After management server 204 receives the new, signed SSL certificate from the certificate authority, the administrator directs management server 204 to write the new SSL certificate in server certificate database 205 and restart web server 202 to apply the new certificate that includes the updates made in step 401 (step 428). The administrator at client 101 manually directs management server 204 in steps 424, 426 and 428 by making entries into a screen interface, for management server 204, presented by web browser 207.

Refer again to decision 403, yes branch where management server 204 determines that server system 109 is currently using a self-signed SSL certificate. In such a case, management server 204 queries the administrator at client 101 if he or she would like management server 204 to automatically regenerate the self-signed SSL certificate (step 404). If the administrator responds that he or she does not want management server 204 to automatically generate the new, self-signed SSL certificate, management server 204 notifies the administrator to initiate manual creation of the new, self-signed SSL certificate (step 405) and restart the TCP/IP stack on server system 109 (step 433). In response, the administrator manually directs management server 204 to create the new, self-signed SSL certificate (step 434), write the certificate to server certificate database 205 (step 436) and restart web server 202 to start using the new certificate (step 438). The administrator at client 101 manually directs management server 204 in steps 434, 436 and 438 by making entries into a screen interface, for management server 204, presented by web browser 207.

Refer again to step 404, yes branch where the administrator responds that he or she wants management server 204 to automatically generate a new, self-signed SSL certificate. In response, management server 204 automatically generates the new self-signed SSL certificate, stores the new self-signed certificate in server certificate database 205, and restarts the TCP/IP stack on server system 109 and web server 202 to apply the changes made in step 401 (step 425).

After steps 415, 425, 428 or 438, the operator at client 101 can request an SSL certificate from web server 202 to establish a secure connection with web server 202, and interface with management server 204 to perform functions as described in the detailed description of FIG. 2.

Based on the foregoing, a system, method and program product for updating an SSL certificate have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method of updating an SSL certificate for a server computer system, said method comprising the steps of:
    detecting, by a management server within said server computer system, changes to one or more current network configuration settings for said server computer system;
    determining, by said management server upon detecting said changes to said one or more current network configuration settings, whether or not a web server within said server computer system is configured to use SSL certificates for establishing connection over a network with a client computer;
    if said web server within said server computer system is determined by said management server to be configured to use said SSL certificates, ascertaining by said management server whether a current SSL certificate for said server computer system is a self-signed SSL certificate or a SSL certificate signed by a certificate authority;
    if said current SSL certificate is ascertained to be said SSL certificate signed by said certificate authority, querying in a request to an administrator of said server computer system whether or not to generate a new certificate signing request (CSR) using said changes to said one or more network configuration settings to obtain from said certificate authority a new SSL certificate signed by said certificate authority; and
    on receiving an affirmative response to said request from said administrator, automatically generating said new certificate signing request (CSR) for sending to said certificate authority for obtaining said new SSL certificate
    if said current SSL certificate is ascertained to be said self-signed SSL certificate, querying in a request to an administrator of said server computer system whether or not to generate a new self-signed SSL certificate; and
    on receiving an affirmative response to said request from said administrator, automatically generating said new self-signed SSL certificate using said changes to said one or more current network configuration settings.

2. A method according to claim 1, further comprising the steps of:
    receiving said new SSL certificate signed by said certificate authority;
    storing said new SSL certificate signed by said certificate authority in a certificate database; and
    restarting said web server to use said new SSL certificate signed by said certificate authority.

3. A method according to claim 1, wherein said determining step further comprises the step of:
    if said web server within said server computer system is not configured to use said SSL certificates, restarting said web server to apply said changes to said one or more current network configuration settings.

4. A method according to claim 1, wherein said automatically generating step further comprises the steps of:
    writing said new certificate signing request (CSR) generated to a removable media;
    querying whether or not said administrator wants to temporarily use a self-signed version of said new certificate signing request (CSR) created until said new SSL certificate signed by said certificate authority is received; and
    if said administrator wants to temporarily use said self-signed version of said new certificate signing request (CSR) created, automatically generating said self-signed version of said new certificate signing request (CSR) created.

5. A method according to claim 1, further comprising the steps of:
    querying whether or not said administrator wants to begin immediate use of said new self-signed SSL certificate generated; and
    if said administrator wants to begin use of said new self-signed SSL certificate, restarting said web server using said new self-signed SSL certificate generated.

* * * * *